Figure 4:
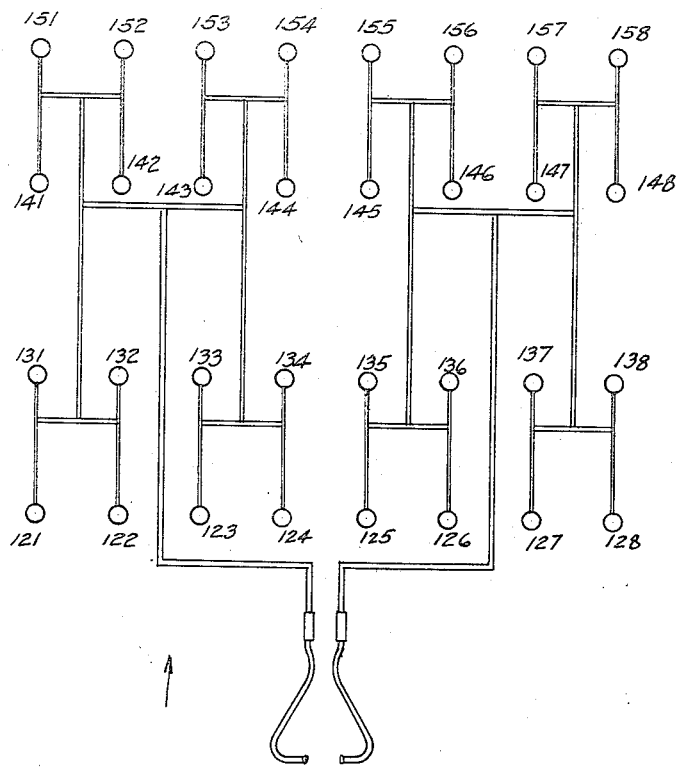

Jan. 12, 1926. 1,569,292
M. MASON
DETERMINATION OF WAVE ENERGY DIRECTION
Filed June 25, 1919 4 Sheets-Sheet 1
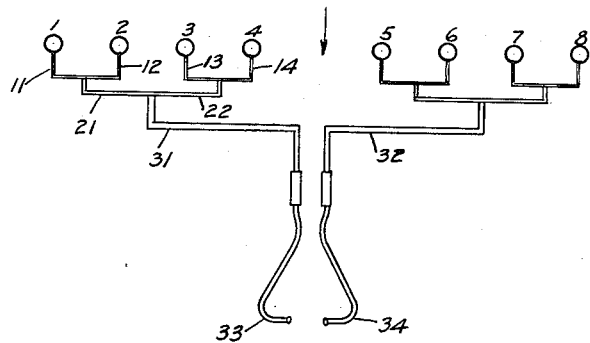
Fig.1.
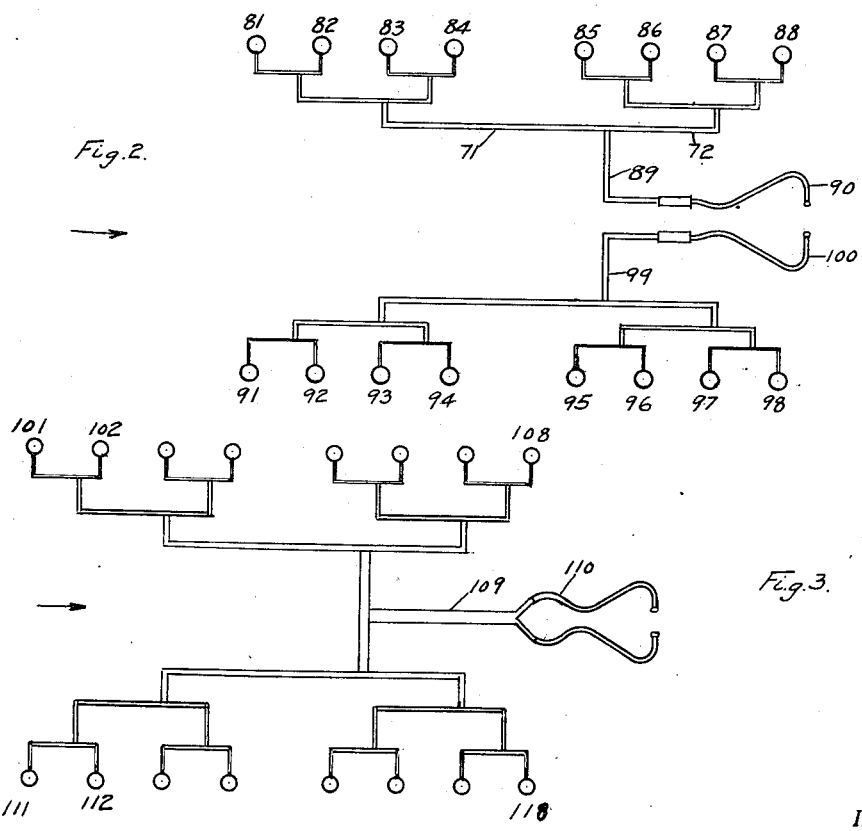
Fig.2.
Fig.3.
INVENTOR.
Max Mason

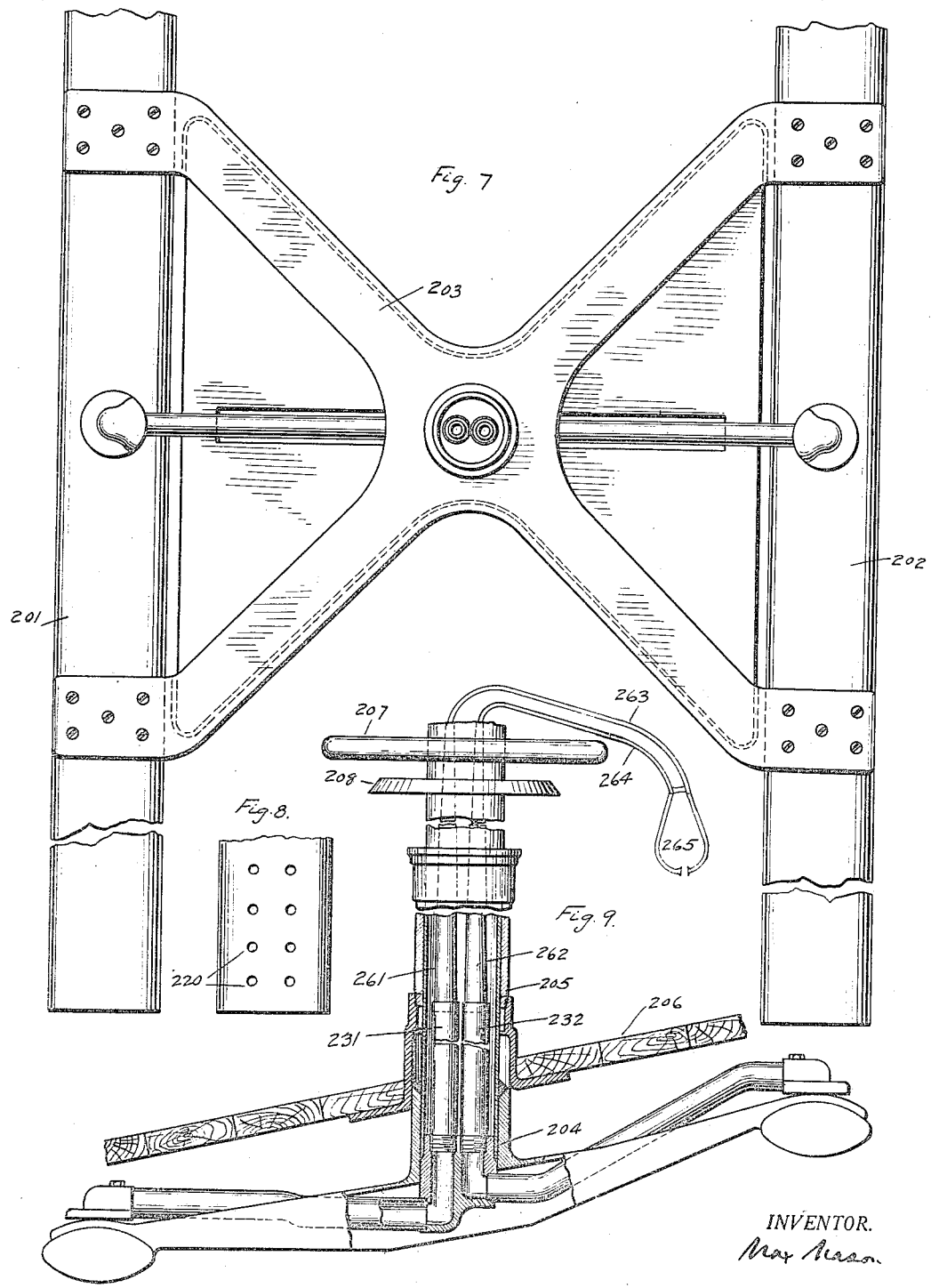

Jan. 12, 1926. 1,569,292
M. MASON
DETERMINATION OF WAVE ENERGY DIRECTION
Filed June 25, 1919   4 Sheets-Sheet 4
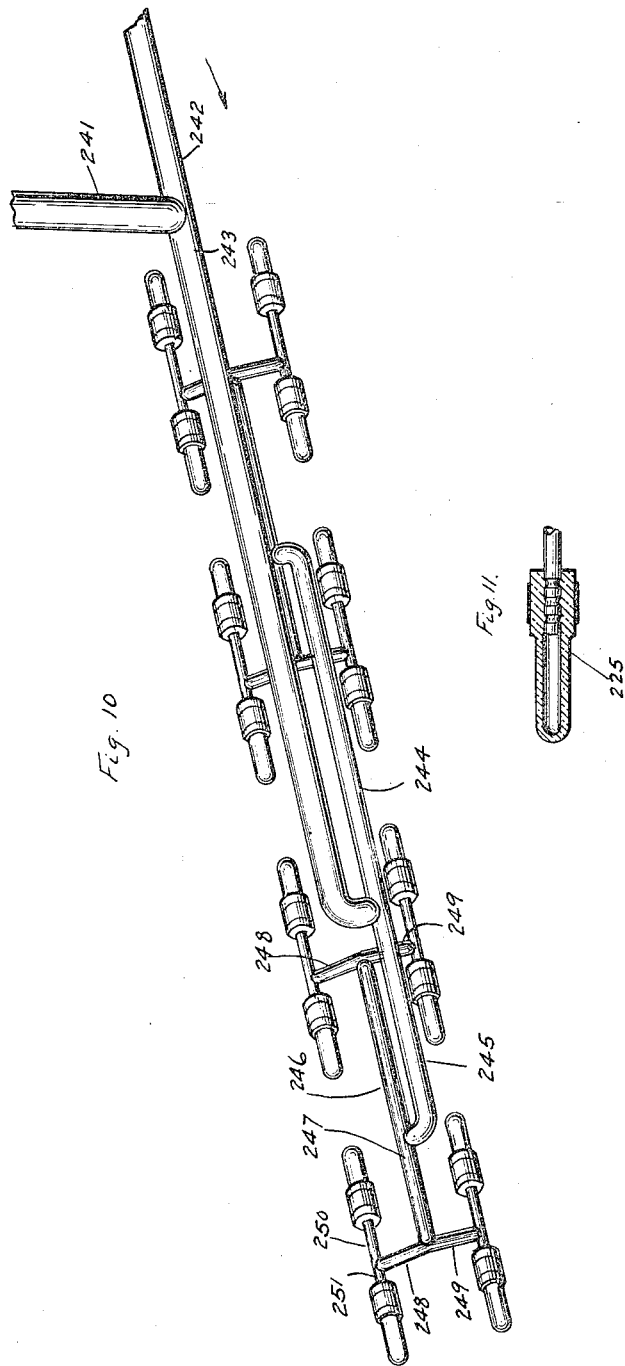
INVENTOR.
Max Mason Patented Jan. 12, 1926.

1,569,292

UNITED STATES PATENT OFFICE.

MAX MASON, OF NEW LONDON, CONNECTICUT, ASSIGNOR TO SUBMARINE SIGNAL COMPANY, OF PORTLAND, MAINE, A CORPORATION OF MAINE.

DETERMINATION OF WAVE-ENERGY DIRECTION.

Application filed June 25, 1919. Serial No. 306,682½.

*To all whom it may concern:*

Be it known that I, MAX MASON, a citizen of the United States, residing at New London, in the county of New London and State of Connecticut, have invented new and useful Improvements in the Determination of Wave-Energy Direction, of which the following is a specification.

The present invention relates to means for determining the direction of wave energy and more specifically to apparatus comprising a plurality of receivers of wave energy combined with compensated transmitting paths for utilizing the received energy. The invention is illustrated as embodied in a submarine listening device having a plurality of receivers with compensated connections for determining the bearing of a submarine source of sound. The invention, however, is not limited in its specific application to sound direction detection but may be embodied in detecting devices for other forms of wave energy.

Referring to the drawings, Figs. 1, 2, 3, 4, 5, and 6, are diagrams illustrating the principles of operation. Fig. 7 is the top plan view of a submarine sound detecting device embodying the invention. Fig. 8 is a fragmentary bottom plan view of one of the receiver-containing arms. Fig. 9 is an elevation, partly in section, of the device. Fig. 10 is a perspective showing the way in which the receiver connections are compensated. Fig. 11 is a detail cross section through one of the rubber nipple receivers.

Referring to Fig. 1, let the receivers numbered 1 to 8 respectively be disposed in a straight line and for purposes of explanation suppose that the receivers have diaphragms or other sound transmitting walls and are connected to ends of air paths through which the sound pulses travel and are brought to the listening device illustrated as a stethoscope. The two receivers 1 and 2 set up sound vibrations in the two air tubes 11 and 12 which are of equal length and are joined to the end of an air tube 21. Similarly the receivers 3 and 4 are connected by air tubes 13 and 14 to the end of the air tube 22. The receivers 5, 6, 7, and 8 are similarly connected by air tubes. The air tubes 21 and 22 are of equal length and are joined to the end of an air tube 31 which is connected with the ear piece 33 of a stethoscope. The other ear piece 34 of the stethoscope is connected to a tube 32 having similar branch connections to the receivers 5, 6, 7, and 8. It will be noted that the length of air path from any receiver to the ear terminal of the stethoscope is the same. Therefore, if a wave front strikes the row of receivers at right angles, the wave pulses traveling along the sound conducting air tubes will all be brought into phase at the stethoscope. The sounds from the receivers 1, 2, 3, and 4, combine to produce a maximum sound in the stethoscope ear piece 33 and the sounds from the receivers 5, 6, 7 and 8 are similarly brought into phase to produce a maximum sound at the stethoscope ear piece 34. The sounds in the two ear pieces are in phase with each other, so that the sound arrives at the two ears of the observer at the same time and appears to be located in a medium plane through the head of the observer, or is said to be binaurally centered.

Instead of having the leads 31 and 32 go to the respective ear pieces of the stethoscope, the tubes 31 and 32 may run into a common collection tube which is connected by a Y to the stethoscope. In this case a sound striking the receivers broadside will be heard at maximum, but without binaural centering.

If the sound wave strikes the row of receivers at an angle other than a right angle, the energy waves connected along the air paths will not be in phase, nor will the sound be binaurally centered, in case a binaural listening device is employed. Suppose the sound is travelling from the left as viewed in Fig. 1. The sound waves will therefore have successive times of arrival at respective receivers 1 to 8, so that the sound pulses from the several receivers will be brought to the stethoscopes out of phase. This causes interference of the sounds from the several receivers making the sound weak. If the line of receivers is divided into two halves, each connected to one ear piece of the stethoscope as shown in Fig. 1, the sound will arrive at the left ear first and will be heard by the observer as being located at the left.

Suppose that the row of receivers 1 to 8 is turned until it is broadside to the direction of the sound. As the row of receivers is turned broadside to the sound, the sound will be heard increasing to a maximum, and the location of the sound will appear to shift from the left to the center. By turning the line of receivers back and forth, the broadside position can be readily determined by the observer listening for the maximum sound, or listening for the combined maximum and binaural, when a binaural device is employed. The line of receivers as shown in Fig. 1, compensated to bring the sounds having a direction of propagation at right angles to the base line of the row of receivers is said to be beam compensated. The transmitting paths from the receivers to the listening device all have fixed predetermined lengths and the device is said to have a fixed compensation, as distinguished from the variable compensation in which the lengths of the transmitting paths may be varied.

It will be noted that sounds, having a direction in the plane normal to the axis of the line of receivers, are all brought into phase and give a maximum response at the listening device, so that sounds which are located at a right angle on each side of the line produce a maximum, and are binaurally centered when the binaural listening device is employed. This 180° ambiguity as to the direction of the sound may be eliminated however by turning the row of receivers. Suppose the sound strikes the row of receivers 1 to 8 in Fig. 1 coming from the top of the sheet, and the row of receivers is turned to the right or clockwise about an axis normal to the plane of the paper. In this case the sound will arrive first at the left ear piece 33 and will appear to shift binaurally to left of the observer, while if the sound were approaching from the opposite direction it would arrive first at the right ear piece 34 and appear to be binaurally shifted to the right of the observer. If the observer turns the line of receives back and forth and observes the direction of the binaural shift he can readily determine from which side of the line the sound is coming.

The characteristic of a beam compensated line of receivers of amplifying all sounds lying in the median plane normal to the axis of the line, has certain disadvantages when such a line is used for submarine listening. Such a line not only amplifies the sound for a particular source on which it is set, but amplifies sounds coming from the opposite direction and also water noise from the ship originating above the line of receivers in this median plane.

These disadvantages may be overcome by forwardly compensating a line of receivers.

Figure 5:
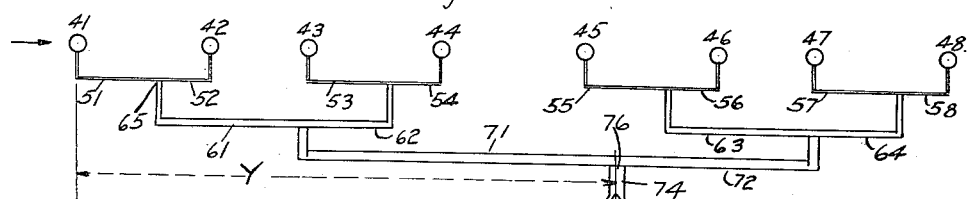
Figure 6:
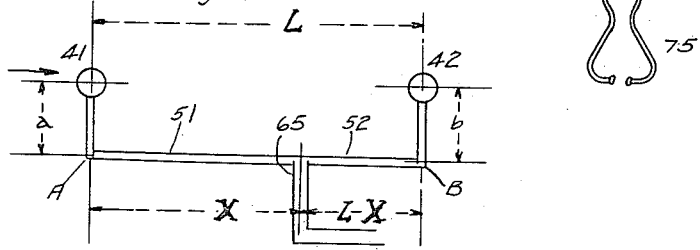

Referring to Fig. 5, let reference numerals 41 to 48 indicate eight receivers placed apart in a strength line and let reference numerals 51 to 58, 61 to 64, 71, 72, and 74 indicate branching sound conducting air paths for collecting the sound from the several receivers and bringing it to a listening device such as the stethoscope 75. The tube connections are similar to those of the beam compensated line shown in Fig. 1, except that the air paths from the receivers to the collection points are not equal in length. Suppose the receivers to be surrounded by water as the wave propagating medium. Then the point 65 where the tubes 51 and 52 join the tube 65 (see Fig. 6) will have a distance from A of .615 times the distance from A to B, or .615 the distance from 41 to 42. This length is so chosen that when a sound pulse advances in the direction of the arrow, the pulses will be received at the point 65 at the same instant. If the pulse reaches the receiver 41 at time $t$, it will reach the receiver 42 at time $$t + \frac{L}{V_w},$$

where $V_w$ is the velocity of sound in water and L is the distance between 41 and 42. The distance X of the point 64 from the point A must be chosen so that $$t + \frac{(a+x)}{V_a} = t + \frac{L}{V_w} + \frac{b+L-x}{V_a}.$$

When V is the velocity of sound in air, and $a$ and $b$ the distance from 41 to A and from 42 to B respectively.

And $a = b$

Then $\frac{V_a}{V_w} = .23$ so that $X = L\frac{V_a}{V_w} + L - X$ $2X = .23L + L = 1.23L$ $X = .615L.$ The joining points in the later stages of collection are determined in a similar manner, the distance Y for example, being .615 times the distance from the receiver 41 to 48. It will be seen that the relatively increased length of the air paths to the receivers at which the sound has earlier times of arrival, will cause the sound pulses from the several receivers to be brought into phase at the point 76 where the stethoscope is connected.

A single forward compensated line may be used as a direction indicator, the line in the case of submarine listening being horizontal and rotated about a vertical axis with a Y connection to both ears from the collection point of the line. The direction is then determined by maximum alone.

The binaural effect is so valuable in determining sound direction that it is advisable to combine the advantages of the binaural effect with the advantages of the forward compensated line. The advantage in detection, i. e., in recognizing the sound of a distant ship in presence of water noise, lies in the fact that the sound from the ship comes from a definite direction, while the water noise is an aggregate from almost all directions. When the binaural device is used, the sound of the distant ship seems to sweep across a stationary sound background when the listening device is rotated or variably compensated, and is therefore easier to recognize than by rhythm alone or by maximum alone.

An arrangement of receivers and compensated connections which combine forward compensation with binaural centering is shown in Fig. 2. The two lines of receivers 81 to 88 and 91 to 98 are disposed in parallel rows spaced apart. Each row is forward compensated as explained in connection with Fig. 5. The two rows of receivers are connected through leads 89 and 99 of equal length to the respective ear pieces, 90 and 100 of a stethoscope. When sound arrives at the receivers coming in the direction shown by the arrow, the sound is heard as a maximum in both ears and is binaurally centered. If a sound comes from any other direction, such as from the side, from behind or from beneath, sound pulses will be out of phase and but faintly heard at the listening device. This not only gives a uni-directional setting for the maximum, but focuses out sound coming from any direction except the particular direction in which the line of receivers is pointed. This is especially valuable for submarine listening in suppressing water noise or in suppressing sounds from ships whose angular bearings differ from the bearing of the ship listened to. The two rows of receivers are mounted to be turned together about a vertical axis on a post extending below the ship's keel in case of a submarine listening device. On turning the rows of receivers, each sound source is heard at a maximum and is binaurally centered when the lines are pointed toward it.

The compensated lines may however be combined in other ways. For example in Fig. 3 the two forward compensated lines of receivers 101 to 108 and 111 to 118 are all joined to a common collecting tube 109 by a Y to the stethoscope 110. In such cases the direction determination is by maximum alone.

In Fig. 4 thirty-two receivers are shown as connected in eight rows of four receivers each in the forward direction and in four rows of eight receivers each in the beam direction. Such a construction combines the beam compensation shown in Fig. 1, with the forward compensation shown in Fig. 2. It will be noted that the receivers shown in Figs. 2, 3, and 4 are disposed in a geometrical configuration of two dimensions. When the groups of receivers are turned in the proper angular direction to receive the sound, they combine beam compensation with forward compensation. The receivers of the groups are disposed in two kinds of rows, one broadside to the sound, which is beam compensated, and the other parallel to the direction of sound propagation, which is forward compensated. For example in Fig. 2 the receivers are disposed in eight beam compensated rows of two receivers each, such as 81 and 91, 82 and 92, etc. It will be noted that the acoustic length of the sound transmitting tubes from each of the receivers in one of these rows is the same. For example in Fig. 2, receivers 81 and 91 have the airpath connections of equal lengths to the stethoscope. The same is true of the rows containing receivers 101 and 111, 102 and 112, etc. of Fig. 3, and the rows containing the receivers 121, 122, 123, 124, 125, 126, 127, and 128, etc. of Fig. 4. The beam compensation may be used as in Fig. 2 for binaural compensation, or as in Fig. 3 for pure maximum compensation, or as in Fig. 4 for combined maximum and binaural compensation. The forwardly compensated rows are shown compensated to give a maximum only, although it will be obvious that they might be compensated for binaural listening by connecting the forward and rear halves to different ear pieces by leads, which would bring the sound waves into phase when the row was pointed toward the sound source. While forward compensation has been shown and is preferably employed with receivers spaced apart in the line of wave propagation, it is obvious that the receivers might be disposed in a row or rows inclined at an angle to the sound direction or might be disposed in various other configurations, provided the wave energy transmitting paths be such as to impose a time lag on the energy transmitted from the receivers in accordance with the relative earlier time arrival at them of the wave front.

It will be obvious that the combined beam and forward compensation may be employed in receivers grouped in a geometrical configuration of three dimensions.

In Figs. 7, 8, 9, 10 and 11 is illustrated the embodiment of the present invention in a submarine listening device, particularly adapted for use with ships. The arrangement of receivers is substantially that of Fig. 2 except that a greater number of receivers is used. The two lines of receivers are enclosed in hollow arms 201 and 202 which are carried on a spider 203 from a post 204. The post 204 is arranged to be raised or lowered through a housing 205 which extends through the ship's bottom 206. The post 204 in Fig. 9 is shown as drawn up close to the bottom of the ship where it is normally held when the ship is under way. When the ship is stopped for listening or is proceeding at slow speeds for listening purposes, the post 204 is lowered allowing the receiver-containing the arms 201 and 202 to drop to a position several feet below the ship and clear of interference from the ship's keel. The device is rotated by means of a hand wheel 207 and is provided with a scale 208 which enables the operator to read the angular bearing of the source of sound set upon. The arms 201 and 202 are made of sheet metal and have holes 220 through which water can reach and surround the receivers. The sound waves pass freely through the metal walls of the arms and to the water inside which surrounds the receivers.

The receivers and their connections, which are enclosed in the arms 201 and 202 are shown in Figs. 10 and 11.

Each receiver consists of a small nipple 225 of soft rubber clamped so making a water tight joint to the end of its sound transmitting metal tube. The several receivers are connected to the two pipes 231 and 232 in the post 204 by means of branching pipes which are forward compensated. In Fig. 10 is shown the arrangement of the compensated branching tubes of the rear half of one of the receiver lines. This is compensated for sounds coming in the direction of the arrow. The tube 241 joins one of the two vertical tubes 231 or 232 shown in Fig. 9. The tube 241 has two branches, one 242 extending forward and the other 243 extending rearward, corresponding to the two branch tubes 71 and 72 shown in the diagram of Fig. 2, the tube 242 being longer than the tube 243 by the proper precomputed amount. The tube 243 connects with two branches 244 and 245 which are similarly of unequal lengths. These two branches 244 and 245 each further subdivides into two smaller tributary branches 246 and 247. Each of the tubes 246 and 247 branches into two crosswise disposed tubes 248 and 249 which are equal in length. Each of these cross tubes branches into forward and rearward extending tubes 250 and 251 of the proper unequal length, upon which are carried the nipples 225. The inequality in the length of the branch tubes is calculated in accordance with the relative velocity of sound in air and water as explained in connection with the diagrams of Figs. 5 and 6, so that the sound pulses will be collected in phase at the various tube junctions and finally brought into phase in the two vertical tubes 231 and 232. The tubes 231 and 232 are provided with cones 261 and 262 which bring down their cross section so gradually as to avoid reflection and loss of sound. The cones 261 and 262 terminate in rubber tubes 263 and 264 leading to the respective ear pieces of the stethoscope 265.

In order to avoid reflection and loss of sound there should be a conversation of cross section in joining the various branch paths, for example, the tube 243 should have a cross sectional area equal to the sum of the cross sectional areas of the two tributary branches 244 and 245, and the branch 245 should have a cross sectional area equal to the combined cross sectional areas of its tributary branch tubes 246 and 247, and so on. It is found that this preservation of the cross sectional area of the air path is necessary for the best conservation of the sound travelling through the tubes. If the area of the sound path is to be reduced it should be done with gradual tapering cones, such as shown at 261 and 262 in order to avoid reflection and loss of sound.

The particular receiver shown in the drawings is of the soft rubber nipple type. However, other types of receivers may be used. The receiver should not have a resonant point within the significant wave frequencies which are to be received. If resonant receivers are used, such for example as resonant diaphragms, it is found that the receivers will resonate at their own natural frequencies, and the free vibrations of the several receivers will not in general be in phase with each other, so that interfering vibrations will be set up in the system. For this reason it is important to employ nonresonant receivers.

While the present invention has been specifically illustrated and described with reference to the detection of sound waves in water, it is to be understood that the invention may be employed for other purposes and in connection with other forms of wave energy. It is to be understood, therefore, that the present invention is not limited to its specific embodiment herein illustrated, but may be embodied in other structures and employed for other purposes, within the scope of the following claims.

I claim:—

1. In apparatus of the character described, the combination of two or more receivers of wave energy, means for bodily turning the group of receivers, and means for transmitting and utilizing the received wave energy comprising wave energy conducting paths from the receivers precomputed so as to impose on the energy transmitted from one receiver time lag, with relation to the energy transmitted from another receiver at which the wave energy has a later time of arrival, equal to the time of such later arrival when the sound waves pass over the group of receivers in a particular direction with relation to its geometric configuration, whereby a maximum response is obtained when the group of receivers is turned so that the waves pass over it in this direction, substantially as described.

2. In apparatus of the character described, the combination of a row of two or more receivers of wave energy, means for turning the row of receivers, and means for transmitting and utilizing the received energy comprising energy conducting paths from the receivers compensated to impose on the energy transmitted from one receiver a time lag, with relation to the energy transmitted from another receiver at which the wave energy has a later arrival, equal to the time for the wave energy to travel between the receivers through the surrounding wave conducting medium, whereby a maximum response is obtained when the row of receivers is in line with the direction of wave propagation, substantially as described.

3. In apparatus of the character described, the combination of a row of two or more acoustic receivers, means for bodily turning the row of receivers, a listening device, and means for transmitting the sound waves from the receivers to the listening device, including air paths from the receivers of a difference in acoustic length precomputed to impose on sound waves coming from a receiver or receivers having an earlier time of arrival of the sound waves, a time lag equal to the time required for the sound waves to travel the distance between the receivers through the surrounding wave conducting medium, so as to obtain a maximum sound in the listening device when the row of receivers is pointed toward the sound source, substantially as described.

4. In apparatus of the character described, the combination of a row of two or more receivers of wave energy and means for transmitting and utilizing the received energy comprising energy conducting paths from the receivers having fixed compensation to impose on the energy transmitted from one receiver a time lag, with relation to the energy transmitted from another receiver at which the wave energy has a later arrival, equal to the time for the wave energy to travel between the receivers through the surrounding wave conducting medium, substantially as described.

5. In apparatus of the character described, the combination of a plurality of receivers of wave energy disposed in a geometric group having at least two dimensions, and means for collecting and utilizing the received energy comprising energy transmitting paths from the several receivers so proportioned for the relative time of energy traverse as to cause the simultaneous arrival at the desired place of the energy transmitted from the several receivers, substantially as described.

6. In apparatus of the character described, the combination of a plurality of receivers of wave energy disposed in a geometric group configuration having at least two dimensions, means for bodily turning the group of receivers, and means for collecting and utilizing the received energy comprising energy transmitting paths from the several receivers compensated so as to impose on the wave energy transmitted from the receivers, time lags proportioned in accordance with the relative earlier arrival of the energy waves at such receivers, for waves passing in a predetermined direction with relation to the group configuration of the receivers, whereby a maximum response is obtained when the group of receivers is turned so that the wave energy passes over it in such predetermined direction, substantially as described.

7. In apparatus of the character described the combination of a plurality of receivers of wave energy disposed in a geometrical configuration of at least two dimensions, and means for collecting the received energy, comprising paths from the receivers which are spaced apart in one direction, having the same time for the travel of the energy thereover, whereby the energy from a wave front striking these receivers broadside is brought into phase, and paths from the receivers spaced apart in the direction of wave propagation, having relatively different times for the travel of the energy precomputed so as to bring into phase the wave energy from a wave front striking these receivers successively, substantially as described.

8. In apparatus of the character described, the combination of two parallel rows of receivers of wave energy, means for bodily rotating the two rows of receivers together, means for collecting and bringing the energy from the several receivers of each row into phase at a collecting point when the lines are pointed toward the wave source, comprising wave energy conducting paths extending from the several receivers and precomputed to impose on the energy transmitted from the different receivers, relative time lags equal to the time required for the waves to travel the distance between the receivers in the surrounding wave conducting medium, and means for bringing the energy of two lines taken separately into phase, comprising wave conducting paths of equal length leading from the collecting points of the respective lines, substantially as described.

9. In apparatus for submarine sound detection, the combination of a plurality of receivers of wave energy, disposed in two parallel rows, means for bodily rotating the rows of receivers, means for collecting and bringing the wave energy from the several receivers of each row into phase at a collecting point when the rows are pointed toward the wave source, comprising wave energy conducting paths extending to the several receivers of the row precomputed to impose on the energy transmitted from the different receivers, relative time lag equal to the time required for the waves to travel the distance between the receivers in the surrounding wave conducting medium, a binaural listening device having two ear pieces, and an energy conducting path from each ear piece to the common collection point of one of the receiver rows, substantially as described.

10. In apparatus of the character described, the combination of a plurality of groups of non-resonant receivers, and means for collecting and bringing the wave energy from the several receivers of each group into phase at a common collecting point including compensated wave energy transmitting paths from the several receivers, substantially as described.

11. In apparatus of the character described, the combination of a plurality of submarine sound receivers having non-resonant walls, and compensated air paths from the several receivers extending to a common collecting point for bringing the sound waves set up in the air paths by the receivers into phase, substantially as described.

12. In apparatus of the character described, the combination of a plurality of acoustic receivers, a listening device, and connections from the receivers to the listening device comprising an air tube having tributary branch tubes, each branch in turn having tributary branch tubes, and so on, the last set of branch tubes being connected to the receivers, the cross section of each tube being substantially equal to the combined cross sections of its tributary branches, substantially as described.

13. In apparatus of the character described, the combination of a plurality of acoustic receivers, a listening device and connections from the receivers to the listening device comprising an air tube having compensated tributary branch tubes, each branch in turn having compensated tributary branch tubes, and so on, the last set of branch tubes being connected to the receivers, substantially as described.

14. In apparatus of the character described, the combination of a plurality of receivers of wave energy, and means for collecting the energy from the several receivers comprising an energy conducting path having compensated tributary branches, each branch in turn having compensated tributary branches, and so on, the last set of branches being connected with receivers, substantially as described.

15. In apparatus of character described, the combination of a plurality of receivers of wave energy disposed in rows at right angles to each other, comprising means for transmitting and utilizing the received energy including beam compensated energy transmitting paths for one set of rows and forward compensated energy transmitting paths from the other set of rows, substantially as described.

16. A device for receiving substantially in phase at a single indicating instrument sound waves coming to a plurality of receivers comprising such plurality of receivers, said indicating instrument and connections between said receivers and said instrument adapted to transmit to said instrument in phase such selection of said receivers as are caused by compressional waves coming from a given direction and to cause the interference of vibrations caused by other compressional waves.

MAX MASON.